(12) United States Patent
Shimizu et al.

(10) Patent No.: US 7,562,730 B2
(45) Date of Patent: Jul. 21, 2009

(54) HYBRID VEHICLE AND CONTROL METHOD OF HYBRID VEHICLE

(75) Inventors: Yasuo Shimizu, Toki (JP); Hideto Watanabe, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 426 days.

(21) Appl. No.: 11/632,132

(22) PCT Filed: Mar. 2, 2006

(86) PCT No.: PCT/JP2006/304533

§ 371 (c)(1),
(2), (4) Date: Jan. 11, 2007

(87) PCT Pub. No.: WO2006/093338

PCT Pub. Date: Sep. 8, 2006

(65) Prior Publication Data

US 2008/0023238 A1    Jan. 31, 2008

(30) Foreign Application Priority Data

Mar. 3, 2005 (JP) ............................. 2005-058746

(51) Int. Cl.
*B60W 10/06* (2006.01)
(52) U.S. Cl. .............. 180/65.2; 180/65.1; 180/65.225; 180/65.265; 180/65.275; 180/65.28
(58) Field of Classification Search ............... 180/65.2, 180/65.1, 65.225, 65.265, 65.275, 65.28, 180/65.23, 65.285, 65.245, 65.25
See application file for complete search history.

(56) References Cited

U.S. PATENT DOCUMENTS

| 6,161,640 A * | 12/2000 | Yamaguchi ................. 180/65.8 |
| 6,480,767 B2 * | 11/2002 | Yamaguchi et al. ........... 701/22 |
| 6,574,535 B1 * | 6/2003 | Morris et al. .................. 701/22 |
| 7,108,088 B2 * | 9/2006 | Muta ..................... 180/65.235 |

(Continued)

FOREIGN PATENT DOCUMENTS

EP        1 369 281 A1    12/2003

(Continued)

*Primary Examiner*—Christopher P Ellis
*Assistant Examiner*—Bryan A Evans
(74) *Attorney, Agent, or Firm*—Oliff & Berridge, PLC (57) ABSTRACT

In a hybrid vehicle equipped with an engine and a motor that are connected to a driveshaft linked to an axle via a gear mechanism, on condition that a torque demand Tr* required for the driveshaft is lower than a preset reference torque level Tref (step S220) and that a vehicle speed V is lower than a preset reference speed level Vref (step S230), the drive control of the invention idles the engine (step S240) regardless of a stop request of the engine (steps S120 and S210). This arrangement effectively reduces the potential for backlash or gear rattle in the gear mechanism. On condition that the vehicle speed V is not lower than the preset reference speed level Vref (step S220), on the other hand, the drive control of the invention stops the operation of the engine (step S250) in response to the stop request of the engine (steps S120 and S210) even under the torque demand Tr* of lower than the preset reference torque level Tref (step S230). This arrangement desirably enhances the energy efficiency of the hybrid vehicle.

13 Claims, 8 Drawing Sheets

U.S. PATENT DOCUMENTS

| | | | |
|---|---|---|---|
| 2004/0040759 A1* | 3/2004 | Shimizu et al. | 180/65.2 |
| 2005/0016781 A1 | 1/2005 | Muta | |

FOREIGN PATENT DOCUMENTS

| | | |
|---|---|---|
| JP | A 10-306739 | 11/1998 |
| JP | A 11-093727 | 4/1999 |
| JP | A 11-173171 | 6/1999 |
| JP | A 2000-125413 | 4/2000 |
| JP | A 2004-254434 | 9/2004 |
| WO | WO 99/24280 | 5/1999 |

* cited by examiner

Fig. 11

HYBRID VEHICLE AND CONTROL METHOD OF HYBRID VEHICLE

TECHNICAL FIELD

The present invention relates to a hybrid vehicle and a control method of the hybrid vehicle.

BACKGROUND ART

In a proposed hybrid vehicle, an internal combustion engine and a motor MG1 are connected via a planetary gear unit to a driveshaft, which is linked with an axle via a gear mechanism, and a motor MG2 is connected to the driveshaft (see, for example, Japanese Patent Laid-Open Gazette No. H11-93727). This prior art hybrid vehicle stops the operation of the engine in response to an engine stop request on condition that the vehicle speed is within a preset range, while continuing the operation of the engine on condition that the vehicle speed is out of the preset range. Such engine stop control aims to prevent the driver from feeling the shock of backlash or gear rattle in the gear mechanism.

DISCLOSURE OF THE INVENTION

An important challenge in the hybrid vehicle is not only to prevent the driver from feeling the shock of backlash or gear rattle in the gear mechanism but to reduce the potential for backlash or gear rattle in the gear mechanism. Another important issue is to enhance the energy efficiency of the hybrid vehicle. The simultaneous pursuit of these requirements, that is, the reduced potential for backlash or gear rattle in the gear mechanism and the enhanced energy efficiency of the hybrid vehicle, is thus highly demanded.

The hybrid vehicle of the invention and the control method of the hybrid vehicle thus aim to reduce the potential for backlash or gear rattle in a gear mechanism. The hybrid vehicle of the invention and the control method of the hybrid vehicle also aim to enhance the energy efficiency of the hybrid vehicle.

At least part of the above and the other related objects is attained by a hybrid vehicle and a control method of the hybrid vehicle of the invention having the configurations discussed below.

The present invention is directed to a hybrid vehicle. The hybrid vehicle includes: an internal combustion engine that outputs power to a driveshaft linked to an axle via a gear mechanism; a motor that inputs and outputs power from and to the driveshaft; an electric power-mechanical power input output mechanism that is connected to an output shaft of the internal combustion engine and to the driveshaft and outputs at least part of the output power of the internal combustion engine to the driveshaft through input and output of electric power and mechanical power; an accumulator unit that is capable of inputting and outputting electric power from and to the motor and the electric power-mechanical power input output mechanism; a driving force demand setting module that sets a driving force demand to be output to the driveshaft; a stop-start requirement module that gives a stop request of the internal combustion engine upon satisfaction of a preset operation stop condition and gives a start request of the internal combustion engine upon satisfaction of a preset operation start condition; and a control module that, on condition that the driving force demand is not lower than a preset reference driving force, controls the internal combustion engine, the electric power-mechanical power input output mechanism, and the motor to stop operation of the internal combustion engine and to ensure output of a driving force equivalent to the driving force demand to the driveshaft, in response to the stop request of the internal combustion engine given by the stop-start requirement module. On condition that the driving force demand is lower than the preset reference driving force, the control module controls the internal combustion engine, the electric power-mechanical power input output mechanism, and the motor to keep the internal combustion engine in an operating state and to ensure output of the driving force equivalent to the driving force demand to the driveshaft, regardless of the stop request of the internal combustion engine.

On condition that a driving force demand required for the driveshaft is not lower than a preset reference driving force, the hybrid vehicle of the invention controls the internal combustion engine, the electric power-mechanical power input output mechanism, and the motor to stop the operation of the internal combustion engine and to ensure output of a driving force equivalent to the driving force demand to the driveshaft in response to a stop request of the internal combustion engine given upon satisfaction of a preset operation stop condition. On condition that the driving force demand is lower than the preset reference driving force, the hybrid vehicle controls the internal combustion engine, the electric power-mechanical power input output mechanism, and the motor to keep the internal combustion engine in the operating state and to ensure output of the driving force equivalent to the driving force demand to the driveshaft regardless of the stop request of the internal combustion engine. The reference driving force used for comparison with the driving force demand is preferably set to be greater than a specific driving force that is substantially equivalent to a maximum amplitude of torque pulsation applied to the driveshaft in a stop of the internal combustion engine. This arrangement effectively reduces the potential for backlash or gear rattle in the gear mechanism.

In one preferable embodiment of the invention, the hybrid vehicle further includes a vehicle speed measurement unit that measures a vehicle speed of the hybrid vehicle. On condition that the measured vehicle speed is not lower than a preset reference speed, the control module controls the internal combustion engine, the electric power-mechanical power input output mechanism, and the motor to stop the operation of the internal combustion engine in response to the stop request of the internal combustion engine even under the driving force demand of lower than the preset reference driving force. This arrangement effectively enhances the energy efficiency of the hybrid vehicle. The reference speed is preferably set to a specific level that causes the potential backlash or gear rattle in the gear mechanism to be concealed in general road noise. This arrangement effectively prevents the driver from feeling the shock of backlash or gear rattle in the gear mechanism. In this preferable embodiment, the hybrid vehicle may further have a slope detection unit that detects a road slope. On condition that the detected road slope is an uphill slope and is not less than a preset reference slope, the control module controls the internal combustion engine, the electric power-mechanical power input output mechanism, and the motor to keep the internal combustion engine in the operating state regardless of the stop request of the internal combustion engine even under the measured vehicle speed of not lower than the preset reference speed. This arrangement effectively prevents the driver from feeling the shock of backlash or gear rattle in the gear mechanism, which is triggered by a decrease on the vehicle speed lower than the preset reference speed in a stop of the internal combustion engine.

In another preferable embodiment of the invention, the hybrid vehicle further includes a temperature measurement unit that measures a temperature of the internal combustion engine. On condition that the measured temperature of the internal combustion engine is lower than a preset reference temperature, the control module controls the internal combustion engine, the electric power-mechanical power input output mechanism, and the motor to keep the internal combustion engine in the operating state regardless of the stop request of the internal combustion engine even under the driving force demand of not lower than the preset reference driving force. This arrangement effectively prevents the driver from feeling the shock of backlash or gear rattle in the gear mechanism in a stop of the internal combustion engine.

In still another preferable embodiment of the invention, the motor is linked to the driveshaft via a transmission. Further, the electric power-mechanical power input output mechanism may include: a three shaft-type power input output module that is linked to three shafts, the output shaft of the internal combustion engine, the driveshaft, and a rotating shaft, and automatically inputs and outputs power from and to a residual one shaft based on powers input from and output to any two shafts among the three shafts; and another motor that is capable of inputting and outputting power from and to the rotating shaft. Furthermore, the electric power-mechanical power input output mechanism may include a pair-rotor motor that has a first rotor connected to the output shaft of the internal combustion engine and a second rotor connected to the driveshaft, and is driven to rotate through relative rotation of the first rotor to the second rotor.

The present invention is also directed to a control method of a hybrid vehicle. The hybrid vehicle includes: an internal combustion engine; an electric power-mechanical power input output mechanism that is connected to an output shaft of the internal combustion engine and to a driveshaft linked to an axle via a gear mechanism and outputs at least part of the output power of the internal combustion engine to the driveshaft through input and output of electric power and mechanical power; a motor that inputs and outputs power from and to the driveshaft; and an accumulator unit that is capable of inputting and outputting electric power from and to the motor and the electric power-mechanical power input output mechanism. On condition that a driving force demand required for the driveshaft is not lower than a preset reference driving force, the control method controls the internal combustion engine, the electric power-mechanical power input output mechanism, and the motor to stop operation of the internal combustion engine and to ensure output of a driving force equivalent to the driving force demand to the driveshaft, in response to a stop request of the internal combustion engine given upon satisfaction of a preset operation stop condition. On condition that the driving force demand is lower than the preset reference driving force, the control method controls the internal combustion engine, the electric power-mechanical power input output mechanism, and the motor to keep the internal combustion engine in an operating state and to ensure output of the driving force equivalent to the driving force demand to the driveshaft, regardless of the stop request of the internal combustion engine.

On condition that a driving force demand required for the driveshaft is not lower than a preset reference driving force, the control method of the invention controls the internal combustion engine, the electric power-mechanical power input output mechanism, and the motor to stop the operation of the internal combustion engine and to ensure output of a driving force equivalent to the driving force demand to the driveshaft, in response to a stop request of the internal combustion engine given upon satisfaction of a preset operation stop condition. On condition that the driving force demand is lower than the preset reference driving force, the hybrid vehicle controls the internal combustion engine, the electric power-mechanical power input output mechanism, and the motor to keep the internal combustion engine in the operating state and to ensure output of the driving force equivalent to the driving force demand to the driveshaft, regardless of the stop request of the internal combustion engine. The reference driving force used for comparison with the driving force demand is preferably set to be greater than a specific driving force that is substantially equivalent to a maximum amplitude of torque pulsation applied to the driveshaft in a stop of the internal combustion engine. This arrangement effectively reduces the potential for backlash or gear rattle in the gear mechanism.

In one preferable embodiment of the invention, on condition that a measured vehicle speed of the hybrid vehicle is not lower than a preset reference speed, the control method controls the internal combustion engine, the electric power-mechanical power input output mechanism, and the motor to stop the operation of the internal combustion engine in response to the stop request of the internal combustion engine even under the driving force demand of lower than the preset reference driving force. This arrangement effectively enhances the energy efficiency of the hybrid vehicle. The reference speed is preferably set to a specific level that causes the potential backlash or gear rattle in the gear mechanism to be concealed in general road noise. This arrangement effectively prevents the driver from feeling the shock of backlash or gear rattle in the gear mechanism. In this case, on condition that a detected road slope is an uphill slope and is not less than a preset reference slope, the control method may control the internal combustion engine, the electric power-mechanical power input output mechanism, and the motor to keep the internal combustion engine in the operating state regardless of the stop request of the internal combustion engine even under the measured vehicle speed of not lower than the preset reference speed. This arrangement effectively prevents the driver from feeling the shock of backlash or gear rattle in the gear mechanism, which is triggered by a decrease on the vehicle speed lower than the preset reference speed in a stop of the internal combustion engine.

In another preferable embodiment of the invention, on condition that a measured temperature of the internal combustion engine is lower than a preset reference temperature, the control method controls the internal combustion engine, the electric power-mechanical power input output mechanism, and the motor to keep the internal combustion engine in the operating state regardless of the stop request of the internal combustion engine even under the driving force demand of not lower than the preset reference driving force. This arrangement effectively prevents the driver from feeling the shock of backlash or gear rattle in the gear mechanism in a stop of the internal combustion engine.

BEST MODES OF CARRYING OUT THE INVENTION

Figure 1:
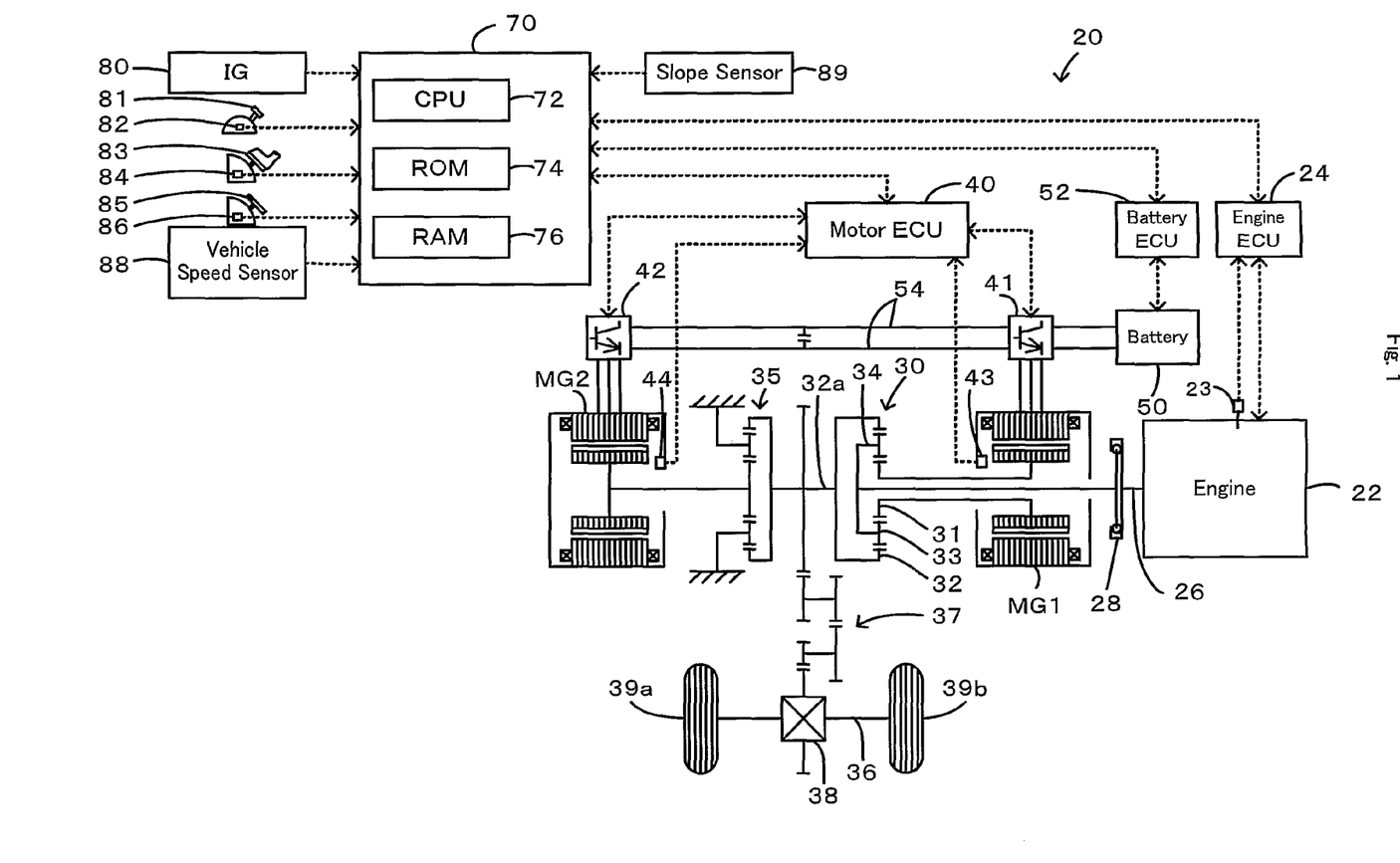
FIG. 1 schematically illustrates the configuration of a hybrid vehicle in one embodiment of the invention.

One mode of carrying out the invention is discussed below as a preferred embodiment. FIG. 1 schematically illustrates the configuration of a hybrid vehicle 20 in one embodiment of the invention. As illustrated, the hybrid vehicle 20 of the embodiment includes an engine 22, a three shaft-type power distribution integration mechanism 30 that is linked to a crankshaft 26 or an output shaft of the engine 22 via a damper 28, a motor MG1 that is connected to the power distribution integration mechanism 30 and has power generation capability, a motor MG2 that is connected to the power distribution integration mechanism 30 via a reduction gear 35, and a hybrid electronic control unit 70 that controls the operations of the whole hybrid vehicle 20.

The engine 22 is an internal combustion engine that consumes a hydrocarbon fuel, such as gasoline or light oil, to output power. The engine 22 is under control of an engine electronic control unit 24 (hereafter referred to as engine ECU 24). The engine ECU 24 receives signals from various sensors that measure and detect the conditions of the engine 22. For example, the engine ECU 24 inputs a cooling water temperature tw from a cooling water temperature sensor 23 attached to the cooling system of the engine 22. The engine ECU 24 outputs diverse control signals and driving signals to drive and control the engine 22 and implement, for example, fuel injection control, ignition control, and intake air flow regulation. The engine ECU 24 establishes communication with the hybrid electronic control unit 70. The engine ECU 24 receives control signals from the hybrid electronic control unit 70 to drive and control the engine 22, while outputting data regarding the driving conditions of the engine 22 to the hybrid electronic control unit 70 according to the requirements.

The power distribution and integration mechanism 30 has a sun gear 31 that is an external gear, a ring gear 32 that is an internal gear and is arranged concentrically with the sun gear 31, multiple pinion gears 33 that engage with the sun gear 31 and with the ring gear 32, and a carrier 34 that holds the multiple pinion gears 33 in such a manner as to allow free revolution thereof and free rotation thereof on the respective axes. Namely the power distribution and integration mechanism 30 is constructed as a planetary gear mechanism that allows for differential motions of the sun gear 31, the ring gear 32, and the carrier 34 as rotational elements. The carrier 34, the sun gear 31, and the ring gear 32 in the power distribution and integration mechanism 30 are respectively coupled with the crankshaft 26 of the engine 22, the motor MG1, and the reduction gear 35 via ring gear shaft 32a. While the motor MG1 functions as a generator, the power output from the engine 22 and input through the carrier 34 is distributed into the sun gear 31 and the ring gear 32 according to the gear ratio. While the motor MG1 functions as a motor, on the other hand, the power output from the engine 22 and input through the carrier 34 is combined with the power output from the motor MG1 and input through the sun gear 31 and the composite power is output to the ring gear 32. The power output to the ring gear 32 is thus finally transmitted to the driving wheels 39a and 39b via the gear mechanism 37, the differential gear 38, and the axle from ring gear shaft 32a.

The motors MG1 and MG2 are constructed as known synchronous motor generators that may be actuated both as a generator and as a motor. The motors MG1 and MG2 transmit electric powers to and from a battery 50 via inverters 41 and 42. Power lines 54 connecting the battery 50 with the inverters 41 and 42 are structured as common positive bus and negative bus shared by the inverters 41 and 42. Such connection enables electric power generated by one of the motors MG1 and MG2 to be consumed by the other motor MG2 or MG1. The battery 50 may thus be charged with surplus electric power generated by either of the motors MG1 and MG2, while being discharged to supplement insufficient electric power. The battery 50 is neither charged nor discharged, when the input and output of electric powers are balanced between the motors MG1 and MG2. Both the motors MG1 and MG2 are driven and controlled by a motor electronic control unit 40 (hereafter referred to as motor ECU 40). The motor ECU 40 inputs signals required for driving and controlling the motors MG1 and MG2, for example, signals representing rotational positions of rotors in the motors MG1 and MG2 from rotational position detection sensors 43 and 44 and signals representing phase currents to be applied to the motors MG1 and MG2 from current sensors (not shown). The motor ECU 40 outputs switching control signals to the inverters 41 and 42. The motor ECU 40 executes a rotation speed computation routine (not shown) to calculate rotation speeds Nm1 and Nm2 of the rotors of the motors MG1 and MG2 from the input signals from the rotational position detection sensors 43 and 44. The motor ECU 40 establishes communication with the hybrid electronic control unit 70 to drive and control the motors MG1 and MG2 in response to control signals received from the hybrid electronic control unit 70, while outputting data regarding the driving conditions of the motors MG1 and MG2 to the hybrid electronic control unit 70 according to the requirements.

The battery 50 is under control of a battery electronic control unit (hereafter referred to as battery ECU) 52. The battery ECU 52 receives diverse signals required for control of the battery 50, for example, an inter-terminal voltage measured by a voltage sensor (not shown) disposed between terminals of the battery 50, a charge-discharge current measured by a current sensor (not shown) attached to the power line 54 connected with the output terminal of the battery 50, and a battery temperature Tb measured by a temperature sensor (not shown) attached to the battery 50. The battery ECU 52 outputs data relating to the state of the battery 50 to the hybrid electronic control unit 70 via communication according to the requirements. The battery ECU 52 calculates a state of charge (SOC) of the battery 50, based on the accumulated charge-discharge current measured by the current sensor, for control of the battery 50.

The hybrid electronic control unit 70 is constructed as a microprocessor including a CPU 72, a ROM 74 that stores processing programs, a RAM 76 that temporarily stores data, and a non-illustrated input-output port, and a non-illustrated communication port. The hybrid electronic control unit 70 receives various inputs via the input port: an ignition signal from an ignition switch 80, a gearshift position SP from a gearshift position sensor 82 that detects the current position of a gearshift lever 81, an accelerator opening Acc from an accelerator pedal position sensor 84 that measures a step-on amount of an accelerator pedal 83, a brake pedal position BP from a brake pedal position sensor 86 that measures a step-on amount of a brake pedal 85, a vehicle speed V from a vehicle speed sensor 88, and a road slope θ from a slope sensor 89. The hybrid electronic control unit 70 communicates with the engine ECU 24, the motor ECU 40, and the battery ECU 52 via the communication port to transmit diverse control signals and data to and from the engine ECU 24, the motor ECU 40, and the battery ECU 52, as mentioned previously.

The hybrid vehicle 20 of the embodiment thus constructed calculates a torque demand to be output to the ring gear shaft 32a functioning as the drive shaft, based on observed values of a vehicle speed V and an accelerator opening Acc, which corresponds to a driver's step-on amount of an accelerator pedal 83. The engine 22 and the motors MG1 and MG2 are subjected to operation control to output a required level of power corresponding to the calculated torque demand to the ring gear shaft 32a. The operation control of the engine 22 and the motors MG1 and MG2 selectively effectuates one of a torque conversion drive mode, a charge-discharge drive mode, and a motor drive mode. The torque conversion drive mode controls the operations of the engine 22 to output a quantity of power equivalent to the required level of power, while driving and controlling the motors MG1 and MG2 to cause all the power output from the engine 22 to be subjected to torque conversion by means of the power distribution integration mechanism 30 and the motors MG1 and MG2 and output to the ring gear shaft 32a. The charge-discharge drive mode controls the operations of the engine 22 to output a quantity of power equivalent to the sum of the required level of power and a quantity of electric power consumed by charging the battery 50 or supplied by discharging the battery 50, while driving and controlling the motors MG1 and MG2 to cause all or part of the power output from the engine 22 equivalent to the required level of power to be subjected to torque conversion by means of the power distribution integration mechanism 30 and the motors MG1 and MG2 and output to the ring gear shaft 32a, simultaneously with charge or discharge of the battery 50. The motor drive mode stops the operations of the engine 22 and drives and controls the motor MG2 to output a quantity of power equivalent to the required level of power to the ring gear shaft 32a.

Figure 2:
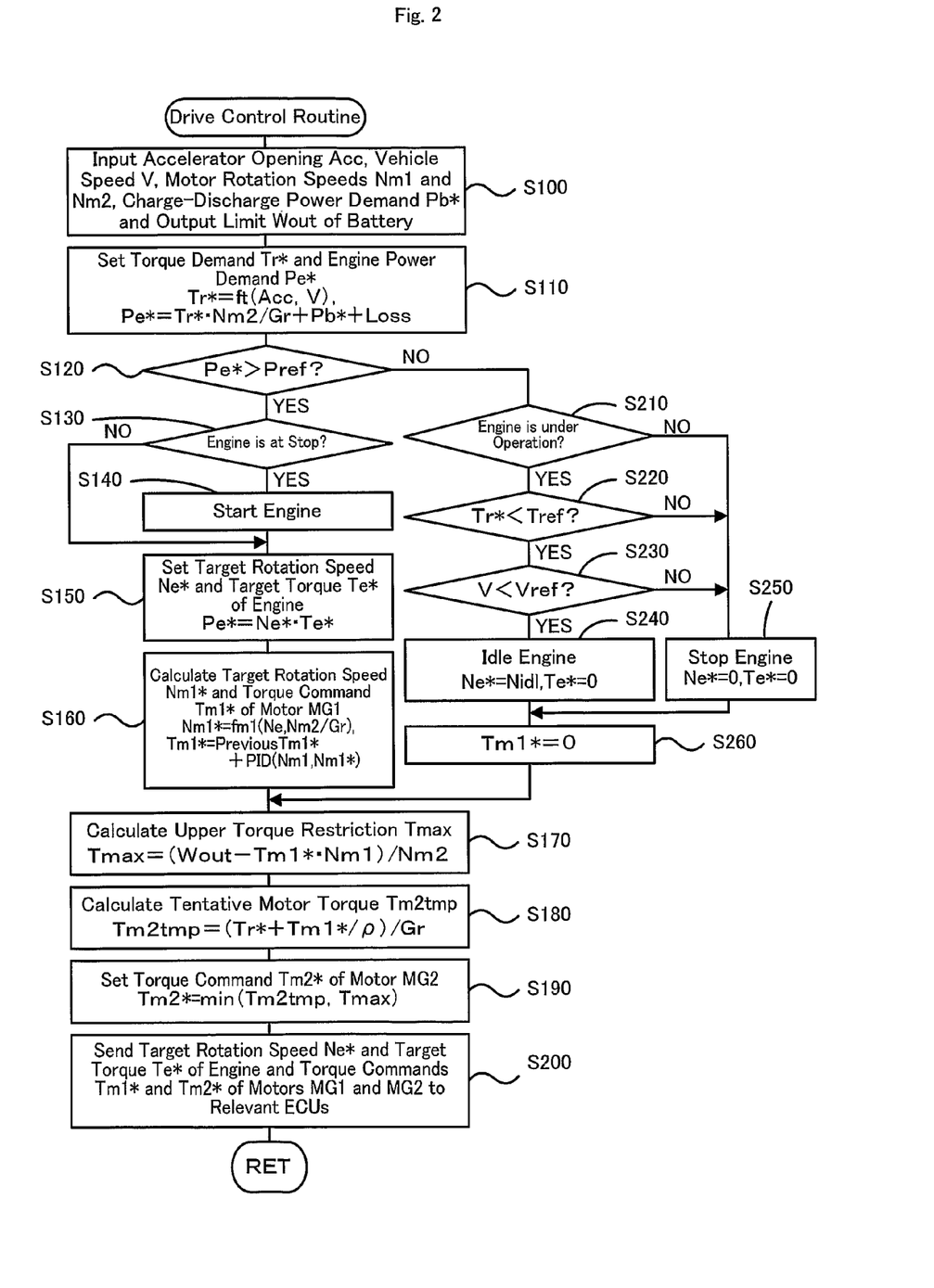
FIG. 2 is a flowchart showing a drive control routine executed by a hybrid electronic control unit included in the hybrid vehicle of the embodiment.

The description regards a series of control operations executed in the hybrid vehicle 20 of the embodiment having the configuration discussed above. FIG. 2 is a flowchart showing a drive control routine executed by the hybrid electronic control unit 70. This drive control routine is performed repeatedly at preset time intervals, for example, at every several msec.

In the drive control routine of FIG. 2, the CPU 72 of the hybrid electronic control unit 70 first inputs various data required for control, that is, the accelerator opening Acc from the accelerator pedal position sensor 84, the vehicle speed V from the vehicle speed sensor 88, rotation speeds Nm1 and Nm2 of the motors MG1 and MG2, a charge-discharge power demand Pb* to be charged into the battery 50 or to be discharged from the battery 50, and an output limit Wout of the battery 50 (step S100). The rotation speeds Nm1 and Nm2 of the motors MG1 and MG2 are computed from the rotational positions of the respective rotors in the motors MG1 and MG2 detected by the rotational position detection sensors 43 and 44 and are received from the motor ECU 40 by communication. The charge-discharge power demand Pb* of the battery 50 is set based on the state of charge SOC of the battery 50 and is received from the battery ECU 52 by communication. The output limit Wout of the battery 50 is set based on the battery temperature tb and the state of charge SOC and is received from the battery ECU 52 by communication.

Figure 3:
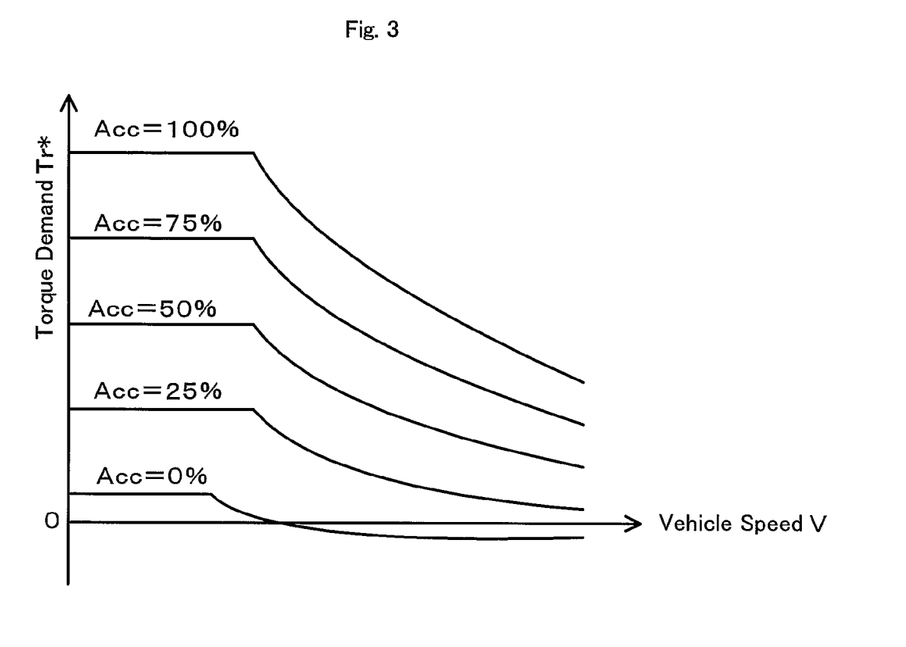
FIG. 3 shows one example of a torque demand setting map.

After the data input, the CPU 72 sets a torque demand Tr* to be output to the ring gear shaft 32a or the driveshaft and an engine power demand Pe* required for the engine 22, based on the input accelerator opening Acc and the input vehicle speed V (step S110). A concrete procedure of setting the torque demand Tr* in this embodiment stores in advance variations in torque demand Tr* against the accelerator opening Acc and the vehicle speed V as a torque demand setting map in the ROM 74 and reads the torque demand Tr* corresponding to the given accelerator opening Acc and the given vehicle speed V from this torque demand setting map. One example of the torque demand setting map is shown in FIG. 3. The engine power demand Pe* is calculated as the sum of the product of the torque demand Tr* and a rotation speed Nr of the ring gear shaft 32a, the charge-discharge power demand Pb* to be charged into or discharged from the battery 50, and a potential loss. The rotation speed Nr of the ring gear shaft 32a is obtained by dividing the rotation speed Nm2 of the motor MG2 by a gear ratio Gr of the reduction gear 35 or by multiplying the vehicle speed V by a conversion factor k.

Figure 4:
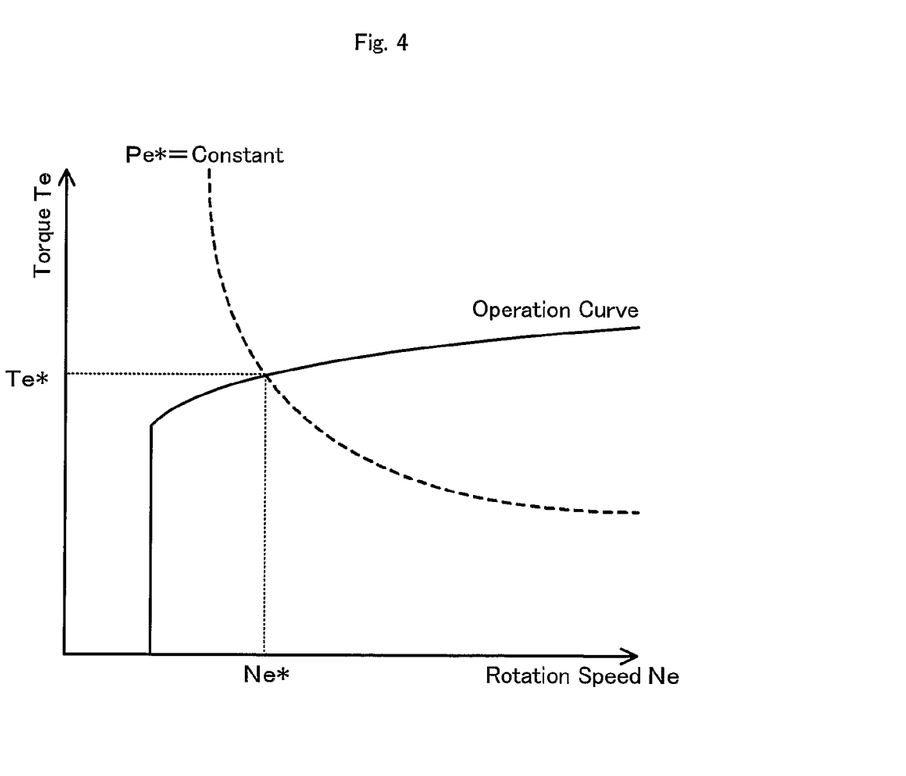
FIG. 4 shows an efficient operation line of an engine to set a target rotation speed Ne* and a target torque Te*.

The CPU 72 subsequently compares the engine power demand Pe* with a preset reference power level Pref (step S120). The reference power level Pref is used as a criterion to specify the requirement or non-requirement for operation of the engine 22 and is set equal to or about to a minimum power level efficiently output from the engine 22. When the engine power demand Pe* is higher than the preset reference power level Pref at step S120, on condition that the engine 22 is at a stop (step S130), the CPU 72 specifies the requirement for a restart of the engine 22 and starts the engine 22 (step S140). The CPU 72 then sets a target rotation speed Ne* and a target torque Te* of the engine 22 corresponding to the engine power demand Pe* (step S150). The target rotation speed Ne* and the target torque Te* of the engine 22 are determined according to an efficient operation curve of ensuring efficient operation of the engine 22 and a curve of the engine power demand Pe*. FIG. 4 shows an efficient operation curve of the engine 22 to set the target rotation speed Ne* and the target torque Te*. As clearly shown in FIG. 4, the target rotation speed Ne* and the target torque Te* are given as an intersection of the efficient operation curve and a curve of constant engine power demand Pe*(=Ne*×Te*).

After setting the target rotation speed Ne* and the target torque Te* of the engine 22, the CPU 72 calculates a target rotation speed Nm1* of the motor MG1 from the target rotation speed Ne* of the engine 22, the rotation speed Nr (=Nm2/Gr) of the ring gear shaft 32a, and a gear ratio ρ of the power distribution integration mechanism 30 according to Equation (1) given below, while calculating a torque command Tm1* of the motor MG1 from the calculated target rotation speed Nm1* and the current rotation speed Nm1 of the motor MG1 according to Equation (2) given below (step S160):

$$Nm1^* = Ne^* \cdot (1+\rho)/\rho - Nm2/(Gr \cdot \rho) \tag{1}$$

$$Tm1^* = \text{Previous } Tm1^* + k1(Nm1^* - Nm1) + k2\int(Nm1^* - Nm1)dt \tag{2}$$

Figure 5:
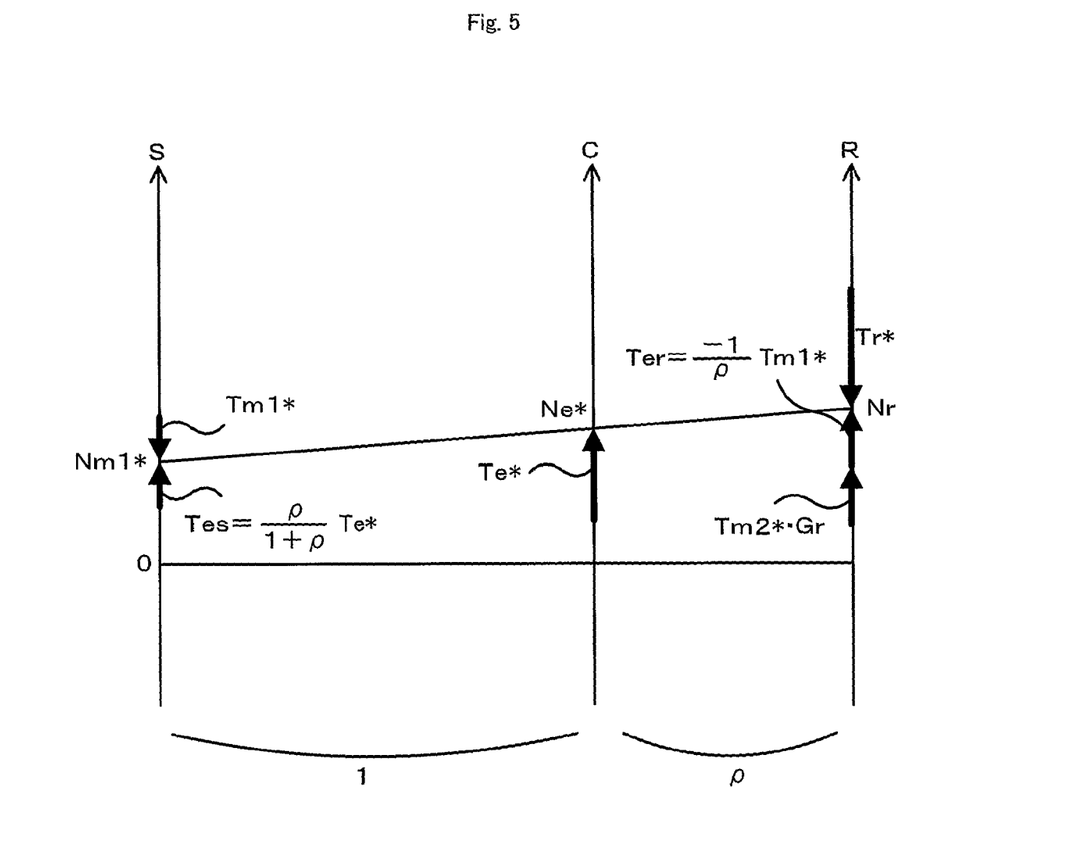
FIG. 5 is an alignment chart showing torque-rotation speed dynamics of respective rotational elements included in a power distribution integration mechanism in the hybrid vehicle of the embodiment.

Equation (1) is a dynamic relational expression of the rotational elements included in the power distribution integration mechanism 30. FIG. 5 is an alignment chart showing torque-rotation speed dynamics of the respective rotational elements included in the power distribution integration mechanism 30. The left axis 'S' represents the rotation speed of the sun gear 31 that is equivalent to the rotation speed Nm1 of the motor MG1. The middle axis 'C' represents the rotation speed of the carrier 34 that is equivalent to the rotation speed Ne of the engine 22. The right axis 'R' represents the rotation speed Nr of the ring gear 32 (ring gear shaft 32a). The target rotation speed Nm1* of the motor MG1 is readily obtainable according to the torque-rotation speed dynamics of this alignment chart. Drive control of the motor MG1 with the settings of the torque command Tm1* and the target rotation speed Nm1* enables rotation of the engine 22 at the target rotation speed Ne*. Equation (2) is a relational expression of feedback control to drive and rotate the motor MG1 at the target rotation speed Nm1*. In Equation (2) given above, 'k1' in the second term and 'k2' in the third term on the right side respectively denote a gain of the proportional and a gain of the integral term. Two upward thick arrows on the axis 'R' in FIG. 5 respectively show a torque that is directly transmitted to the ring gear shaft 32a when the torque Te* is output from the engine 22, and a torque that is applied to the ring gear shaft 32a via the reduction gear 35 when the torque Tm2* is output from the motor MG2.

After calculation of the target rotation speed Nm1* and the torque command Tm1* of the motor MG1, the CPU 72 calculates an upper torque restriction Tmax as a maximum possible torque output from the motor MG2 according to Equation (3) given below (step S170). The calculation subtracts the product of the calculated torque command Tm1* and the current rotation speed Nm1 of the motor MG1, which represents the power consumption (power generation) of the motor MG1, from the output limit Wout of the battery 50 and divides the difference by the current rotation speed Nm2 of the motor MG2:

$$T\text{max}=(W\text{out}-Tm1^*\cdot Nm1)/Nm2 \quad (3)$$

The CPU 72 then calculates a tentative motor torque Tm2tmp as a torque to be output from the motor MG2 from the torque demand Tr*, the torque command Tm1* of the motor MG1, the gear ratio ρ of the power distribution integration mechanism 30, and the gear ratio Gr of the reduction gear 35 according to Equation (4) given below (step S180):

$$Tm2tmp=(Tr^*+Tm1^*/\rho)/Gr \quad (4)$$

A torque command Tm2* of the motor MG2 is set by limiting the calculated tentative motor torque Tm2tmp to the upper torque restriction Tmax (step S190). Such setting of the torque command Tm2* of the motor MG2 restricts the torque demand Tr* to be output to the ring gear shaft 32a or the driveshaft in the range of the output limit Wout of the battery 50. Equation (4) is readily led from the alignment chart of FIG. 5.

After setting the target rotation speed Ne* and the target torque Te* of the engine 22 and the torque commands Tm1* and Tm2* of the motors MG1 and MG2, the CPU 72 sends the target rotation speed Ne* and the target torque Te* of the engine 22 to the engine ECU 24 and the torque commands Tm1* and Tm2* of the motors MG1 and MG2 to the motor ECU 40 (step S200) and exits from this drive control routine. The engine ECU 24 receives the target rotation speed Ne* and the target torque Te* and keeps the engine 22 in its operating state or restarts the engine 22 from a stop. The engine ECU 24 then performs fuel injection control and ignition control to drive the engine 22 at a specified drive point of the target rotation speed Ne* and the target torque Te*. The motor ECU 40 receives the torque commands Tm1* and Tm2* and performs switching control of the switching elements included in the respective inverters 41 and 42 to drive the motor MG1 with the torque command Tm1* and the motor MG2 with the torque command Tm2*.

When the engine power demand Pe* is not higher than the preset reference power level Pref at step S120, on the other hand, on condition that the engine 22 is under operation (step S210), the CPU 72 specifies the requirement for a stop of the engine 22. The CPU 72 then compares the torque demand Tr* with a preset reference torque level Tref (step S220). The reference torque level Tref is set equal to or above a torque practically equivalent to a maximum amplitude of torque pulsation applied to the ring gear shaft 32a or the driveshaft in a stop of the engine 22. The reference torque level Tref depends upon the characteristics of the engine 22. At a stop of the engine 22, the torque pulsation due to the reciprocating motions of pistons or the friction of the pistons in the engine 22 is applied to the ring gear shaft 32a or the driveshaft. Under the condition of a relatively low level of the torque demand Tr*, the torque pulsation may reverse the positive/negative torque output to the ring gear shaft 32a or the driveshaft. This may cause backlash or gear rattle in the gear mechanism 37 or in the differential gear 38. The processing of step S220 determines whether there is a good potential for backlash or gear rattle in the gear mechanism 37 or in the differential gear 38. When the torque demand Tr* is not lower than the preset reference torque level Tref at step S220, the CPU 72 determines that there is substantially no fear of backlash or gear rattle in the gear mechanism 37 or in the differential gear 38. The CPU 72 accordingly sets both the target rotation speed Ne* and the target torque Te* of the engine 22 to '0' to stop the operation of the engine 22 (step S250), and sets the torque command Tm1* of the motor MG1 to '0' (step S260). The CPU 72 then sets the torque command Tm2* of the motor MG2 (steps S170 to S190), sends the target rotation speed Ne* and the target torque Te* of the engine 22 and the torque commands Tm1* and Tm2* of the motors MG1 and MG2 to the relevant engine and motor ECUs 24 and 40 (step S200), and exits from the drive control routine of FIG. 2. The engine ECU 24 receives the target rotation speed Ne* and the target torque Te* both set equal to '0' and stops the operation of the engine 22. When the torque demand Tr* is lower than the preset reference torque level Tref at step S220, on the other hand, the input vehicle speed V is compared with a preset reference speed level Vref (step S230). The reference speed level Vref is used as a criterion to determine whether the potential backlash or gear rattle in the gear mechanism 37 or in the differential gear 38 is concealed in general road noise to be practically unnoticeable to the driver. The reference speed level Vref depends upon the characteristics of the hybrid vehicle 20. When the vehicle speed V is not lower than the preset reference speed level Vref at step S230, the CPU 72 specifies a very little possibility of the driver feeling the shock of backlash or gear rattle in the gear mechanism 37 or in the differential gear 38. The CPU 72 accordingly sets both the target rotation speed Ne* and the target torque Te* of the engine 22 to '0' to stop the operation of the engine 22 (step S250) and executes the processing of and after subsequent step S260. The drive control of this embodiment stops the operation of the engine 22 even under the condition of the torque demand Tr* of lower than the preset reference torque level Tref, when the vehicle speed V is not lower than the preset reference speed level Vref. This engine stop control desirably enhances the energy efficiency of the hybrid vehicle 20. When the vehicle speed V is lower than the preset reference speed level Vref at step S230, on the other hand, the CPU 72 specifies a good possibility of the driver feeling the shock of backlash or gear rattle in the gear mechanism 37 or in the differential gear 38. The CPU 72 accordingly sets the target rotation speed Ne* of the engine 22 to an idle rotation speed Nidl and the target torque Te* to '0' to idle the engine 22 (step S240) and executes the processing of and after subsequent step S260. The drive control of this embodiment keeps the engine 22 in its operating state regardless of a stop request of the engine 22, when the torque demand Tr* is lower than the preset reference torque level Tref and when the vehicle speed V is lower than the preset reference speed level Vref. This effectively reduces the potential for backlash or gear rattle in the gear mechanism 37 or in the differential gear 38. When the engine 22 is at a stop (step S210) under the condition of the engine power demand Pe* of not lower than the preset reference power level Pref (step S120), the CPU 72 sets both the target rotation speed Ne* and the target torque Te* of the engine 22 to '0' to keep the engine 22 at a stop (step S250) and executes the processing of and after step S260.

In the hybrid vehicle 20 of the embodiment described above, the drive control stops the operation of the engine 22 in response to a stop request of the engine 22, on condition that the torque demand Tr* is not lower than the reference torque level Tref, which is equal to or above the torque practically equivalent to the maximum amplitude of torque pulsation applied to the ring gear shaft 32a or the driveshaft in a stop of the engine 22. The drive control keeps the engine 22 in its operating state regardless of a stop request of the engine 22, on condition that the torque demand Tr* is lower than the preset reference torque level Tref. This arrangement effectively reduces the potential for backlash or gear rattle in the gear mechanism 37 or in the differential gear 38. When the vehicle speed V is not lower than the preset reference speed level Vref, which is set as the criterion to determine the concealment of the potential backlash or gear rattle in the general road noise, the drive control of the embodiment stops the operation of the engine 22 even under the condition of the torque demand Tr* of lower than the preset reference torque level Tref. This engine stop control desirably enhances the energy efficiency of the hybrid vehicle 20.

The hybrid vehicle 20 of the embodiment specifies the requirement or non-requirement for a stop of the engine 22 based on the torque demand Tr*, in response to a stop request of the engine 22 (steps S120 and S210) in the drive control routine of FIG. 2. The torque currently output from the motor MG2 (previous Tm2*) may be used, in addition to or in place of the torque demand Tr*, for the specification of the requirement or non-requirement for a stop of the engine 22.

Figure 6:
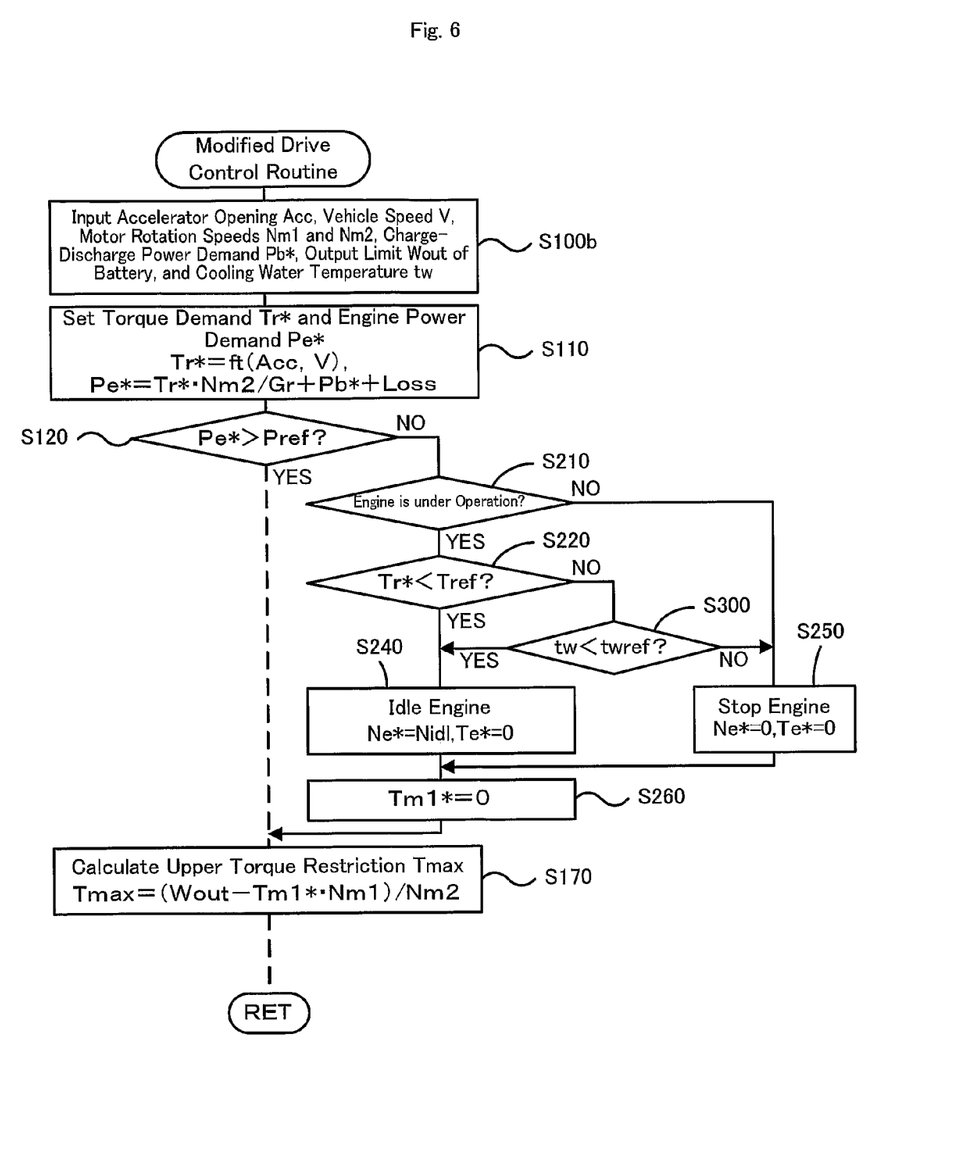
FIG. 6 is a flowchart showing part of a modified flow of the drive control routine executed by the hybrid electronic control unit in one modified example.

The hybrid vehicle 20 of the embodiment specifies the requirement or non-requirement for a stop of the engine 22 based on both the torque demand Tr* and the vehicle speed V, in response to a stop request of the engine 22 (steps S120 and S210) in the drive control routine of FIG. 2. The specification of the requirement or non-requirement for a stop of the engine 22 may be based on only the torque demand Tr*, based on both the torque demand Tr* and the cooling water temperature tw of the engine 22 in place of the vehicle speed V, or based on all the torque demand Tr*, the vehicle speed V, and the cooling water temperature tw. The flowchart of FIG. 6 shows part of a modified flow of the drive control routine where the specification of the requirement or non-requirement for a stop of the engine 22 is based on both the torque demand Tr* and the cooling water temperature tw. The modified drive control routine of FIG. 6 is essentially identical with the drive control routine of FIG. 2, except replacement of steps S100 and S230 with steps S100b and S300. The modified drive control routine of FIG. 6 inputs the cooling water temperature tw of the engine 22 (step S100b), in addition to the required data input at step S100 in the drive control routine of FIG. 2. The cooling water temperature tw is measured by the cooling water temperature sensor 23 and is received from the engine ECU 24 by communication. On condition that the engine power demand Pe* is not higher than the preset reference power level Pref (step S120), that the engine 22 is under operation (step S210), and that the torque demand Tr* is not lower than the preset reference torque level Tref (step S220), the modified drive control routine compares the input cooling water temperature tw with a preset reference temperature level twref (step S300). The reference temperature level twref is set as a criterion to specify the requirement or non-requirement for a stop of the engine 22 and depends upon the characteristics of the engine 22. The engine 22 at relatively low temperatures has large friction in a stop and accordingly gives a good potential for backlash or gear rattle in the gear mechanism 37 or in the differential gear 38. The processing of step S300 determines whether there is a good potential for backlash or gear rattle in the gear mechanism 37 or in the differential gear 38. When the cooling water temperature tw is not lower than the preset reference temperature level twref at step S300, the CPU 72 determines that there is substantially no fear of backlash or gear rattle in the gear mechanism 37 or in the differential gear 38. The CPU 72 accordingly sets both the target rotation speed Ne* and the target torque Te* of the engine 22 to '0' to stop the operation of the engine 22 (step S250) and executes the processing of and after step S260. When the cooling water temperature tw is lower than the preset reference temperature level twref at step S300, on the other hand, the CPU 72 specifies a good possibility of backlash or gear rattle in the gear mechanism 37 or in the differential gear 38 even under the condition of the torque demand Tr* of not lower than the preset reference torque level Tref. The CPU 72 accordingly sets the target rotation speed Ne* of the engine 22 to the idle rotation speed Nidl and the target torque Te* to '0' to idle the engine 22 (step S240) and executes the processing of and after subsequent step S260. This modified drive control also effectively reduces the potential for backlash or gear rattle in the gear mechanism 37 or in the differential gear 38.

Figure 7:
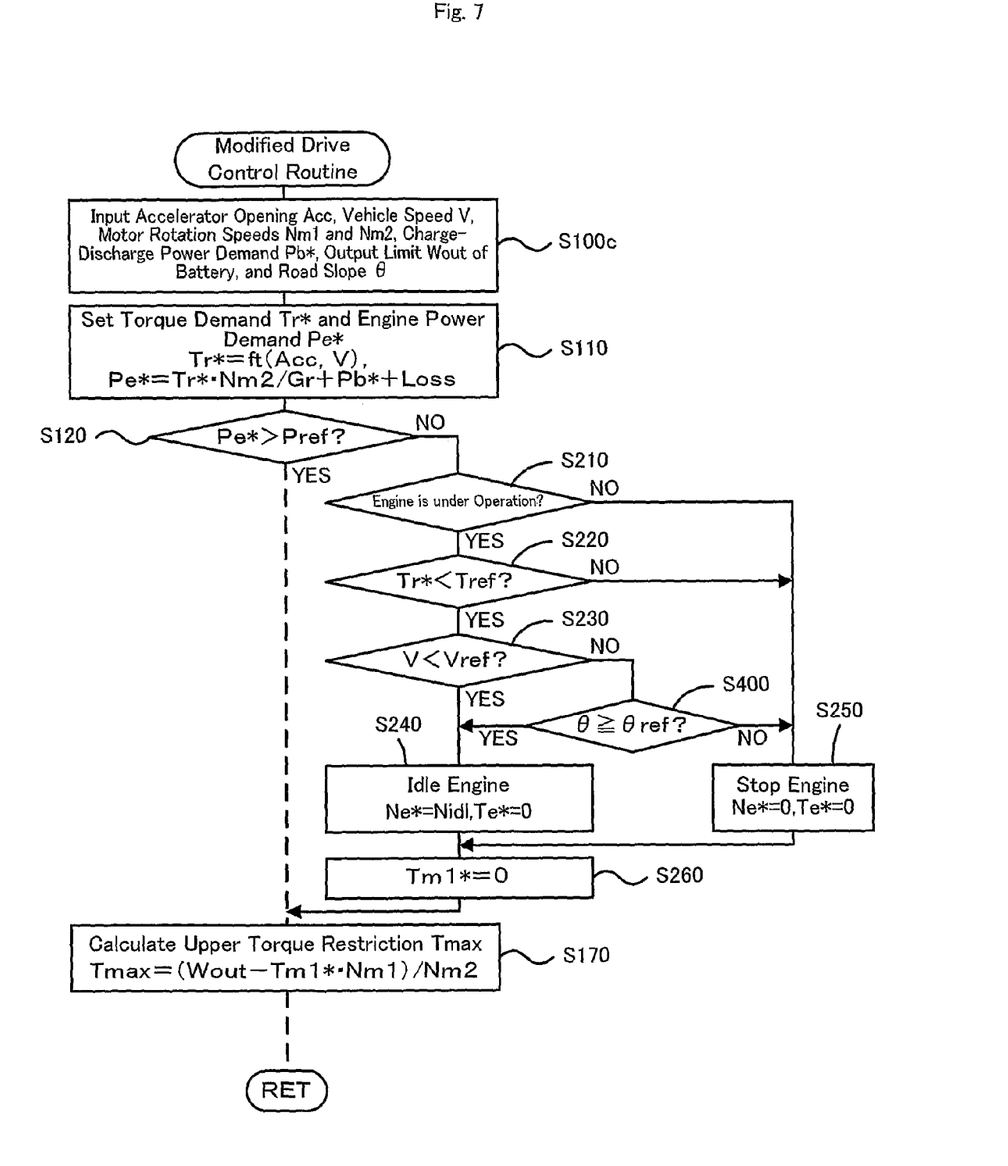
FIG. 7 is a flowchart showing part of a modified flow of the drive control routine executed by the hybrid electronic control unit in another modified example.
Figure 8:
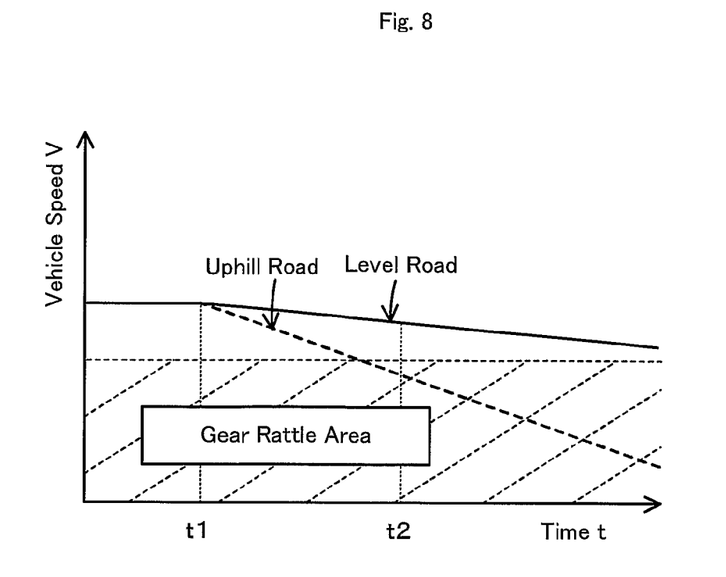
FIG. 8 shows time variations of vehicle speed V on a level road and on an uphill road.

The hybrid vehicle 20 of the embodiment specifies the requirement or non-requirement for a stop of the engine 22 based on both the torque demand Tr* and the vehicle speed V, in response to a stop request of the engine 22 (steps S120 and S210) in the drive control routine of FIG. 2. A road slope θ measured by a slope sensor 89 (see FIG. 1) may additionally be used for the specification of the requirement or non-requirement for a stop of the engine 22. The flowchart of FIG. 7 shows part of a modified flow of the drive control routine with such specification. The modified drive control routine of FIG. 7 is essentially identical with the drive control routine of FIG. 2, except replacement of step S100 with step S100c and addition of step S400. The modified drive control routine of FIG. 7 inputs the road slope θ from the slope sensor 89 (step S100c), in addition to the required data input at step S100 in the drive control routine of FIG. 2. The road slope θ has positive values on uphill roads and negative values on downhill roads. On condition that the engine power demand Pe* is not higher than the preset reference power level Pref (step S120), that the engine 22 is under operation (step S210), that the torque demand Tr* is lower than the preset reference torque level Tref (step S220), and that the vehicle speed V is not lower than the preset reference speed level Vref (step S230), the modified drive control routine compares the road slope θ with a preset reference slope θref (step S400). The reference slope θref is set as a criterion to specify the requirement or non-requirement for a stop of the engine 22 and depends upon the characteristics of the engine 22. It is here assumed that the driver releases the accelerator pedal 83 to stop the engine 22 on a level road and on an uphill road. FIG. 8 shows time variations of the vehicle speed V on a level road and on an uphill road. The curve of solid line shows the time variation of the vehicle speed V on a level road, and the curve of broken line shows the time variation of the vehicle speed V on an uphill road. In response to a stop request of the engine 22 given at a time t1, the engine 22 stops at a time t2. As shown by the solid-line curve, the vehicle speed V gently decreases on the level road after the driver's release of the accelerator pedal 83. In the stop of the engine 22 at the time t2 on the level road in response to the stop request of the engine 22 at the time t1, there is a very little possibility of the driver feeling the shock of backlash or gear rattle in the gear mechanism 37 or in the differential gear 38. As shown by the broken-line curve, on the other hand, the vehicle speed V decreases more rapidly on the uphill road after the driver's release of the accelerator pedal 83 than the decrease on the level road. In the stop of the engine 22 at the time t2 on the level road in response to the stop request of the engine 22 at the time t1, there is a good possibility of the driver feeling the shock of backlash or gear rattle in the gear mechanism 37 or in the differential gear 38. The processing of step S400 determines whether the vehicle speed V is possibly lowered to a level that makes the driver feel the shock of backlash or gear rattle in the gear mechanism 37 or in the differential gear 38. When the road slope θ is less than the preset reference slope θref at step S400, the CPU 72 determines that there is substantially no fear of the driver feeling the shock of backlash or gear rattle in the gear mechanism 37 or in the differential gear 38. The CPU 72 accordingly sets both the target rotation speed Ne* and the target torque Te* of the engine 22 to '0' to stop the operation of the engine 22 (step S250) and executes the processing of and after step S260. When the road slope θ is not less than the preset reference slope θref at step S400, on the other hand, the CPU 72 specifies a good possibility of the driver feeling the shock of backlash or gear rattle in the gear mechanism 37 or in the differential gear 38 even under the condition of the vehicle speed V of not lower than the preset reference speed level Vref. The CPU 72 accordingly sets the target rotation speed Ne* of the engine 22 to the idle rotation speed Nidl and the target torque Te* to '0' to idle the engine 22 (step S240) and executes the processing of and after subsequent step S260. This modified drive control also effectively reduces the potential for the driver feeling the shock of backlash or gear rattle in the gear mechanism 37 or in the differential gear 38.

The hybrid vehicle 20 of the embodiment idles the engine 22 in response to a stop request of the engine 22 (steps S120 and S210) on condition that the torque demand Tr* is lower than the preset reference torque level Tref (step S220) and that the vehicle speed V is lower than the preset reference speed level Vref (step S230) in the drive control routine of FIG. 2. One possible modification may drive the engine 22 at an efficient drive point corresponding to the engine power demand Pe*, instead of idling the engine 22, under such conditions.

Figure 9:
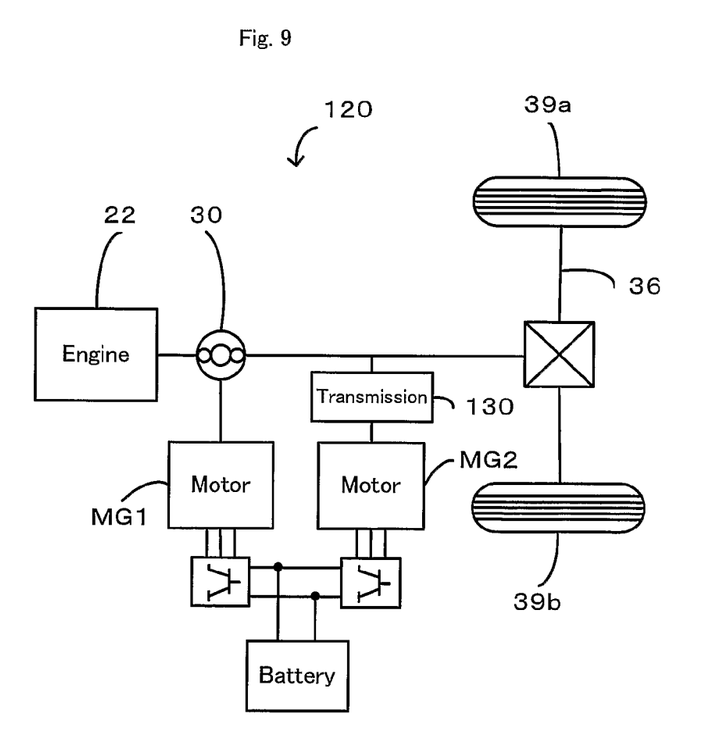
FIG. 9 schematically illustrates the configuration of another hybrid vehicle as one modified example.

In the hybrid vehicle 20 of the embodiment, the power of the motor MG2 is output to the ring gear shaft 32a or the driveshaft via the reduction gear 35. The technique of the invention is, however, not restricted to this configuration but is also applicable to a hybrid vehicle 120 of one modified example shown in FIG. 9. In the hybrid vehicle 120 of this modified configuration, the power of the motor MG2 is output to the ring gear shaft 32a or the driveshaft via a transmission 130.

Figure 10:
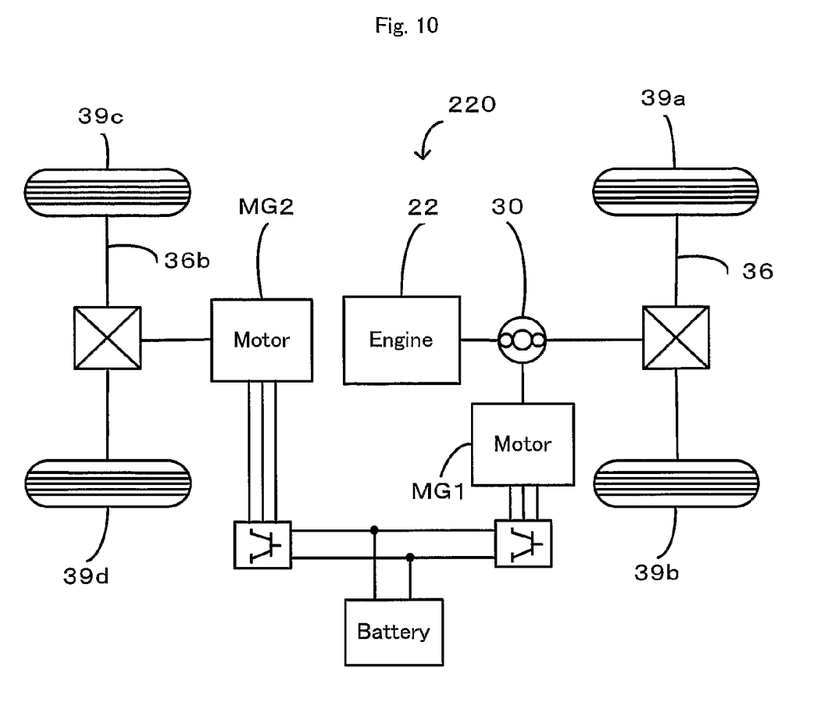
FIG. 10 schematically illustrates the configuration of still another hybrid vehicle as another modified example.

In the hybrid vehicle 20 of the embodiment, the power of the motor MG2 is output to the ring gear shaft 32a or the driveshaft. The technique of the invention is, however, not restricted to this configuration but is also applicable to a hybrid vehicle 220 of another modified example shown in FIG. 10. In the hybrid vehicle 220 of this modified configuration, the power of the motor MG2 is connected to a different axle (an axle 36b linked to wheels 39c and 39d) from the axle connected with the ring gear shaft 32a (the axle 36 linked to the drive wheels 39a and 39b).

Figure 11:
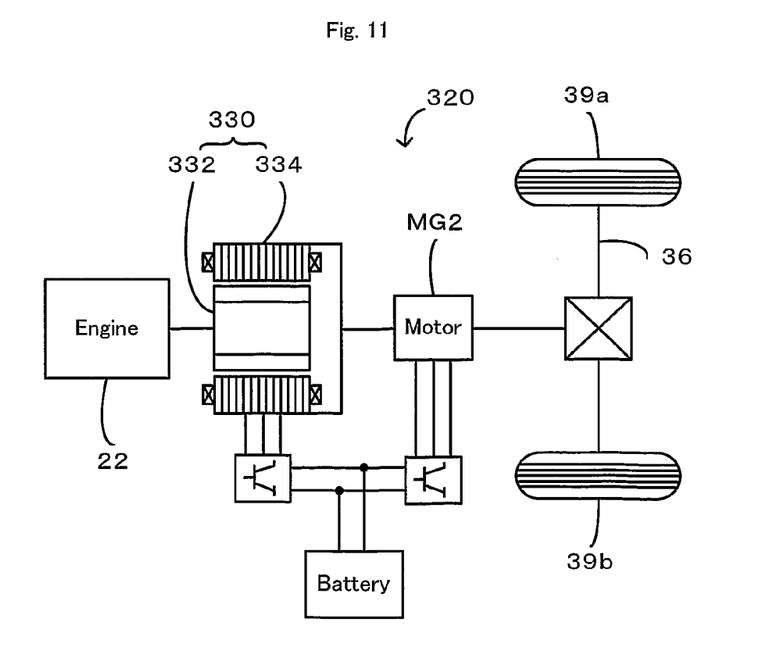
FIG. 11 schematically illustrates the configuration of another hybrid vehicle as still another modified example.

In the hybrid vehicle 20 of the embodiment, the power of the engine 22 is output via the power distribution integration mechanism 30 to the ring gear shaft 32a functioning as the drive shaft linked with the drive wheels 39a and 39b. In another possible modification of FIG. 11, a hybrid vehicle 320 may have a pair-rotor motor 330, which has an inner rotor 332 connected with the crankshaft 26 of the engine 22 and an outer rotor 334 connected with the drive shaft for outputting the power to the drive wheels 39a, 39b and transmits part of the power output from the engine 22 to the drive shaft while converting the residual part of the power into electric power.

The embodiment and its modified examples discussed above are to be considered in all aspects as illustrative and not restrictive. There may be many other modifications, changes, and alterations without departing from the scope or spirit of the main characteristics of the present invention.

INDUSTRIAL APPLICABILITY

The technique of the invention is preferably applicable to the manufacturing industries of hybrid vehicles.

The invention claimed is:

1. A hybrid vehicle, comprising:
an internal combustion engine that outputs power to a driveshaft linked to an axle via a gear mechanism;
a motor that inputs and outputs power from and to the driveshaft;
an electric power-mechanical power input output mechanism that is connected to an output shaft of the internal combustion engine and to the driveshaft and outputs at least part of the output power of the internal combustion engine to the driveshaft through input and output of electric power and mechanical power;
an accumulator unit that is capable of inputting and outputting electric power from and to the motor and the electric power-mechanical power input output mechanism;
a driving force demand setting module that sets a driving force demand to be output to the driveshaft;
a stop-start requirement module that gives a stop request of the internal combustion engine upon satisfaction of a preset operation stop condition and gives a start request of the internal combustion engine upon satisfaction of a preset operation start condition; and
a control module that, on condition that the driving force demand is not lower than a preset reference driving force, controls the internal combustion engine, the electric power-mechanical power input output mechanism, and the motor to stop operation of the internal combustion engine and to ensure output of a driving force equivalent to the driving force demand to the driveshaft, in response to the stop request of the internal combustion engine given by said stop-start requirement module,
on condition that the driving force demand is lower than the preset reference driving force, said control module controlling the internal combustion engine, the electric power-mechanical power input output mechanism, and the motor to keep the internal combustion engine in an operating state and to ensure output of the driving force equivalent to the driving force demand to the driveshaft, regardless of the stop request of the internal combustion engine.

2. A hybrid vehicle in accordance with claim 1, wherein the reference driving force used by said control module for comparison with the driving force demand is set to be greater than a specific driving force that is substantially equivalent to a maximum amplitude of torque pulsation applied to the driveshaft in a stop of the internal combustion engine.

3. A hybrid vehicle in accordance with claim 1, said hybrid vehicle further comprising:
a vehicle speed measurement unit that measures a vehicle speed of said hybrid vehicle,
wherein on condition that the measured vehicle speed is not lower than a preset reference speed, said control module controls the internal combustion engine, the electric power-mechanical power input output mechanism, and the motor to stop the operation of the internal combustion engine in response to the stop request of the internal combustion engine even under the driving force demand of lower than the preset reference driving force.

4. A hybrid vehicle in accordance with claim 3, said hybrid vehicle further comprising:
a slope detection unit that detects a road slope,
wherein on condition that the detected road slope is an uphill slope and is not less than a preset reference slope, said control module controls the internal combustion engine, the electric power-mechanical power input output mechanism, and the motor to keep the internal combustion engine in the operating state regardless of the stop request of the internal combustion engine even under the measured vehicle speed of not lower than the preset reference speed.

5. A hybrid vehicle in accordance with claim 1, said hybrid vehicle further comprising:
a temperature measurement unit that measures a temperature of the internal combustion engine,
wherein on condition that the measured temperature of the internal combustion engine is lower than a preset reference temperature, said control module controls the internal combustion engine, the electric power-mechanical power input output mechanism, and the motor to keep the internal combustion engine in the operating state regardless of the stop request of the internal combustion engine even under the driving force demand of not lower than the preset reference driving force.

6. A hybrid vehicle in accordance with claim 1, wherein the motor is linked to the driveshaft via a transmission.

7. A hybrid vehicle in accordance with claim 1, wherein the electric power-mechanical power input output mechanism comprises:
a three shaft-type power input output module that is linked to three shafts, the output shaft of the internal combustion engine, the driveshaft, and a rotating shaft, and automatically inputs and outputs power from and to a residual one shaft based on powers input from and output to any two shafts among the three shafts; and
another motor that is capable of inputting and outputting power from and to the rotating shaft.

8. A hybrid vehicle in accordance with claim 1, wherein the electric power-mechanical power input output mechanism comprises:
a pair-rotor motor that has a first rotor connected to the output shaft of the internal combustion engine and a second rotor connected to the driveshaft, and is driven to rotate through relative rotation of the first rotor to the second rotor.

9. A control method of a hybrid vehicle, said hybrid vehicle comprising: an internal combustion engine; an electric power-mechanical power input output mechanism that is connected to an output shaft of the internal combustion engine and to a driveshaft linked to an axle via a gear mechanism and outputs at least part of the output power of the internal combustion engine to the driveshaft through input and output of electric power and mechanical power; a motor that inputs and outputs power from and to the driveshaft; and an accumulator unit that is capable of inputting and outputting electric power from and to the motor and the electric power-mechanical power input output mechanism,
on condition that a driving force demand required for the driveshaft is not lower than a preset reference driving force, said control method controlling the internal combustion engine, the electric power-mechanical power input output mechanism, and the motor to stop operation of the internal combustion engine and to ensure output of a driving force equivalent to the driving force demand to the driveshaft, in response to a stop request of the internal combustion engine given upon satisfaction of a preset operation stop condition,
on condition that the driving force demand is lower than the preset reference driving force, said control method controlling the internal combustion engine, the electric power-mechanical power input output mechanism, and the motor to keep the internal combustion engine in an operating state and to ensure output of the driving force equivalent to the driving force demand to the driveshaft, regardless of the stop request of the internal combustion engine.

10. A control method in accordance with claim 9, said control method setting the reference driving force, which is used for comparison with the driving force demand, to be greater than a specific driving force that is substantially equivalent to a maximum amplitude of torque pulsation applied to the driveshaft in a stop of the internal combustion engine.

11. A control method in accordance with claim 9, on condition that a measured vehicle speed of said hybrid vehicle is not lower than a preset reference speed, said control method controlling the internal combustion engine, the electric power-mechanical power input output mechanism, and the motor to stop the operation of the internal combustion engine in response to the stop request of the internal combustion engine even under the driving force demand of lower than the preset reference driving force.

12. A control method in accordance with claim 10, on condition that a detected road slope is an uphill slope and is not less than a preset reference slope, said control method controlling the internal combustion engine, the electric power-mechanical power input output mechanism, and the motor to keep the internal combustion engine in the operating state regardless of the stop request of the internal combustion engine even under the measured vehicle speed of not lower than the preset reference speed.

13. A control method in accordance with claim 9, on condition that a measured temperature of the internal combustion engine is lower than a preset reference temperature, said control method controlling the internal combustion engine, the electric power-mechanical power input output mechanism, and the motor to keep the internal combustion engine in the operating state regardless of the stop request of the internal combustion engine even under the driving force demand of not lower than the preset reference driving force.

* * * * *